(12) United States Patent
Momose et al.

(10) Patent No.: US 7,232,480 B2
(45) Date of Patent: *Jun. 19, 2007

(54) MODIFIED CARBON BLACK CARBON BLACK DISPERSION LIQUID AND WATER BASE INK

(75) Inventors: Masayuki Momose, Nagano-ken (JP); Miharu Kanaya, Nagano-ken (JP); Sohko Itoh, Osaka (JP); Tatsuya Yagyu, Osaka (JP)

(73) Assignees: Seiko Epson Corporation, Tokyo (JP); Orient Chemical Industries, Ltd., Osaka (JP)

( * ) Notice: Subject to any disclaimer, the term of this patent is extended or adjusted under 35 U.S.C. 154(b) by 87 days.

This patent is subject to a terminal disclaimer.

(21) Appl. No.: 10/504,218

(22) PCT Filed: Dec. 26, 2003

(86) PCT No.: PCT/JP03/17036

§ 371 (c)(1),
(2), (4) Date: Jan. 15, 2005

(87) PCT Pub. No.: WO2004/061015

PCT Pub. Date: Jul. 22, 2004

(65) Prior Publication Data

US 2005/0120914 A1 Jun. 9, 2005

(30) Foreign Application Priority Data

Dec. 27, 2002 (JP) ............................ 2002-381301
Mar. 28, 2003 (JP) ............................ 2003-091214
Apr. 3, 2003 (JP) ............................ 2003-100252

(51) Int. Cl.
*C09D 11/00* (2006.01)
(52) U.S. Cl. .................. 106/31.9; 106/31.6; 106/31.86
(58) Field of Classification Search ................ 106/31.9, 106/31.6, 31.86
See application file for complete search history.

(56) References Cited

U.S. PATENT DOCUMENTS 4,443,263 A * 4/1984 Dietz et al. ............ 106/287.24
4,632,867 A * 12/1986 Kuse et al. .................. 428/323
5,032,369 A * 7/1991 Kondo et al. ............... 423/339
5,965,248 A * 10/1999 Saitoh et al. ............. 428/842.3
6,468,342 B1 * 10/2002 Itoh et al. ................... 106/478

FOREIGN PATENT DOCUMENTS

| EP | 1479732 A1 * | 11/2004 |
| JP | 11-335584 A | 12/1999 |
| JP | 2000-319573 | 11/2000 |
| JP | 2001-81355 | 3/2001 |
| JP | 2001-324880 | 11/2001 |

* cited by examiner

*Primary Examiner*—J. A. Lorengo
*Assistant Examiner*—Veronica Faison-Gee
(74) *Attorney, Agent, or Firm*—Ladas and Parry LLP

(57) ABSTRACT

There are provided a carbon black according to which long-term stable storage is possible, clogging is not prone to occurring, and the OD value is high and hence printing with a deep black color is possible, or a carbon black that can be used in a water-based ink that is used in ink jet printer printing, that has low settleability and can thus be stored stably for a long period, for which clogging is not prone to occurring, and for which the reflection density is high and hence printing with a high printing density and a deep black color is possible, a carbon black dispersion having the carbon black dispersed therein, and a water-based ink containing the carbon black. An embodiment of a modified carbon black of the present invention is a modified carbon black obtained by carrying out oxidation treatment on a carbon black having a primary particle diameter of 11 to 18 nm, a BET specific surface area of at least 180 $m^2/g$, a DBP oil absorption of at least 180 mL/100 g, and a value of the BET specific surface area ($m^2/g$) divided by the DBP oil absorption (mL/100 g) of 0.75 to 1.3, and is characterized in that at least lactone groups and carboxyl groups are introduced onto the surface thereof, and the ratio of the mean particle diameter to the primary particle diameter is at least 8.5. Moreover, a carbon black dispersion and a water-based ink of the present invention contain this modified carbon black.

26 Claims, No Drawings

MODIFIED CARBON BLACK CARBON BLACK DISPERSION LIQUID AND WATER BASE INK

The present invention relates to a modified carbon black, and more particularly to a carbon black used in a black ink such as an ink for ink jet printer recording, an ink for writing instruments or an ink for stamps, a carbon black dispersion having the carbon black dispersed therein, and a water-based ink containing the carbon black.

BACKGROUND

Carbon black is widely used as a colorant in water-based inks for printing a black color with ink jet printers.

In general a carbon black raw material powder comprises a secondary agglomerated mass called an agglomerate formed through van der Waals attraction or mere congregation, adhesion or interlocking between aggregates that are primary aggregated bodies in each of which approximately spherical primary particles are congregated together. Unless subjected to treatment, this type of carbon black raw material powder immediately settles without being dispersed in water.

A water-based ink containing such a raw material powder and a dispersant for dispersing the raw material powder has high viscosity, and hence printing is difficult. Modified carbon blacks obtained by oxidizing the surface of the carbon black raw material powder to introduce hydrophilic functional groups such as carboxyl groups so that dispersion in water is easy even if a dispersant is not used are thus used.

As such a modified carbon black, in Patent Document 1 the present inventors have disclosed one having a specified specific surface area and DBP oil absorption (the amount of oil absorption using dibutyl phthalate; referred to as the 'DBP oil absorption' in the present specification). Water-based inks containing this modified carbon black have a low viscosity, and moreover have a high reflection density (optical density; referred to as the 'OD value' in the present specification), and hence dense printing with a deep black color is possible. When using a water-based ink as an ink jet recording ink, the water-based ink must have sufficient stability over time for practical use, but the above water-based inks have not always had sufficient stability over time.

Moreover, there are modified carbon blacks obtained by oxidizing a carbon black raw material powder having a small mean particle diameter. A water-based ink containing such a modified carbon black has good dispersibility with settling not being prone to occur, and hence the storage stability is excellent, and clogging is not prone to occurring. However, if printing is carried out using such an ink, then the reflection density is low, and a printing density sufficient for practical use is no longer exhibited. Moreover, the hue of the ink tends to become a reddish black.

Moreover, in Patent Document 2 there is disclosed a carbon black pigment for water-based inks for which $N_2SA$, IA, $N_2SA/IA$, CTAB, DBP, 24M4 DBP, Tint, and the ratio of total oxygen atoms to total carbon atoms are specified. However, this carbon black pigment for water-based inks has a problem that the OD value is not sufficient in the case of use as an ink jet ink in particular.

(Patent Document 1) Japanese Patent Application Laid-open No. 2000-319573

(Patent Document 2) Japanese Patent Application Laid-open No. 2001-81355

The present invention was accomplished to resolve the above problems; it is an object of the present invention to provide a carbon black that can be used in a water-based ink that is used in ink jet printer printing, that has a reduced settling rate and can thus be stored stably for a long period, for which clogging is not prone to occurring, and for which the reflection density (OD value) is high and hence dense printing with a deep black color is possible, and a water-based ink having this carbon black dispersed therein.

SUMMARY

The present invention attains the above object by providing modified carbon blacks, water-based inks and so on of the constitutions indicated in (1) to (26) below.

(1) A modified carbon black obtained by carrying out oxidation treatment on a carbon black having a primary particle diameter of 11 to 18 nm, a BET specific surface area of at least 180 $m^2/g$, a DBP oil absorption of at least 180 mL/100 g, and a value of the BET specific surface area ($m^2/g$) divided by the DBP oil absorption (mL/100 g) of 0.75 to 1.3, the modified carbon black characterized in that at least lactone groups and carboxyl groups are introduced onto the surface thereof, and the ratio of the mean particle diameter to the primary particle diameter is at least 8.5.

(2) The modified carbon black according to (1), characterized in that the value of the BET specific surface area ($m^2/g$) divided by the DBP oil absorption (mL/100 g) is 0.9 to 1.1.

(3) The modified carbon black according to (1) or (2), characterized in that the mean particle diameter of the modified carbon black is 150 to 250 nm.

(4) The modified carbon black according to any of (1) through (3), characterized in that the amount of lactone groups is at least 500 μmol/g, and the amount of carboxyl groups is at least 700 μmol/g, relative to the weight of carbon black in the modified carbon black.

(5) The modified carbon black according to any of (1) through (4), characterized in that the modified carbon black has a settling rate of not more than 30%.

(6) The modified carbon black according to any of (1) through (5), characterized in that the lactone groups and the carboxyl groups are introduced by oxidizing with a hypohalous acid and/or a hypohalite.

(7) The modified carbon black according to any of (1) through (6), characterized in that the absorbance at a wavelength of 500 nm of a measurement liquid diluted to a modified carbon black concentration of 0.001 wt % is at least 0.47.

As a result of assiduous studies, the present inventors found that by adjusting the mean particle diameter and the settling rate for a dispersion prepared from a self-dispersing carbon black with a specific solvent composition ratio to be within specific ranges, the previously mentioned problems can be resolved. The undermentioned inventions (8) to (13) are based on these findings. The constitutions of these inventions are as follows.

(8) A modified carbon black that can be dispersed and/or dissolved in water without a dispersant, the modified carbon black characterized in that:

the relationships $10 \leq S_A - S_B \leq 50$ and $S_B \leq 40$ hold, wherein $S_A$ is the settling rate (%) for a dispersion A prepared to 13 wt % of the carbon black and 87 wt % of water, and $S_B$ is the settling rate (%) for a dispersion B prepared to 5 wt % of the carbon black, 10 wt % of glycerol, 10 wt % of diethylene glycol mono-n-butyl ether and 75 wt % of water; and the 50% cumulative diameter as measured with a dispersion prepared to a concentration of the carbon black of 0.3 g/L is in a range of 150 to 350 nm.

(9) The modified carbon black according to claim 8, characterized in that the relationships $20 \leq S_A - S_B \leq 50$ and $S_B \leq 30$ hold.

(10) The modified carbon black according to (8) or (9), characterized in that the 50% cumulative diameter as measured with a dispersion prepared to a concentration of the carbon black of 0.3 g/L is in a range of 150 to 250 nm.

(11) The modified carbon black according to any of (8) through (10), characterized by being a modified carbon black obtained by carrying out surface modification on a carbon black having a primary particle diameter of 11 to 18 nm, a BET specific surface area of at least 180 m$^2$/g, a DBP oil absorption of at least 180 mL/100 g, and a value of the BET specific surface area (m$^2$/g) divided by the DBP oil absorption (mL/100 g) of 0.75 to 1.3.

(12) The modified carbon black according to (11), characterized in that the value of the BET specific surface area (m$^2$/g) divided by the DBP oil absorption (mL/100 g) is 0.9 to 1.1.

(13) The modified carbon black according to any of (8) through (12), characterized in that the carbon black is obtained by carrying out oxidation treatment on a carbon black raw material powder with a hypohalous acid and/or a hypohalite.

(14) A method of manufacturing the modified carbon black according to any of (1) through (13), the method characterized by having at least the steps of adding an aqueous solution of a hypohalous acid and/or a hypohalite to a liquid obtained by suspending a carbon black raw material powder prepared using the furnace method in water, carrying out oxidation treatment using a disperser with a 0.6 to 3 mm-diameter milling medium, filtering with 100 to 500 mesh wire netting, and desalinizing the liquid obtained.

(15) A carbon black dispersion, characterized by having the modified carbon black according to any of (1) through (14) dispersed in water.

(16) A water-based ink, characterized by containing the modified carbon black according to any of (1) through (14).

(17) A water-based ink, characterized by containing at least glycerol, a glycol ether compound, and the modified carbon black according to any of (8) through (13).

(18) The water-based ink according to (17), characterized in that the glycol ether compound is selected from glycol butyl ether compounds.

(19) The water-based ink according to any of (16) through (18), characterized by having a penetrability such that the penetration time upon applying the ink onto a recording medium in an amount of 1 mg/cm$^2$ is less than 1 second.

(20) The water-based ink according to any of (16) through (19), characterized by having a surface tension at 20° C. of not more than 45 mN/m.

(21) The water-based ink according to claim (16), (19) or (20), characterized by containing a glycol butyl ether type aqueous organic solvent.

(22) The water-based ink according to any of claims (16) through (21), characterized by containing a nonionic surfactant.

(23) The water-based ink according to (22), characterized in that the nonionic surfactant is an acetylene glycol type surfactant.

(24) A recording method for carrying out printing on a recording medium by attaching an ink, the recording method characterized by using the water-based ink according to any of (16) through (23) as the ink.

(25) An ink jet recording method for carrying out printing by ejecting droplets of an ink and attaching the droplets onto a recording medium, the ink jet recording method characterized by using the water-based ink according to any of (16) through (23) as the ink.

(26) A recorded article, characterized in that it is obtained by carrying out recording using the recording method according to (24) or (25).

DETAILED DESCRIPTION

Following is a description of the present invention through preferred embodiments thereof.

Embodiment A

A modified carbon black of embodiment A is a modified carbon black in which lactone groups and carboxyl groups have been introduced onto the surface thereof, and for which the ratio of the mean particle diameter to the primary particle diameter is at least 8.5, and moreover for which the mean particle diameter is large at 150 to 250 nm and yet the settling rate is not more than 30%.

This modified carbon black is obtained by carrying out oxidation treatment on a carbon black having a primary particle diameter of 11 to 18 nm (i.e. this is the range for the mean of the primary particle diameter), a BET specific surface area of at least 180 m$^2$/g, preferably 180 to 260 m$^2$/g, a DBP oil absorption of at least 180 mL/100 g, preferably 180 to 300 mL/100 g, more preferably 190 to 250 mL/100 g, and a value of the specific surface area (m$^2$/g) divided by the DBP oil absorption (mL/100 g) in a range of 0.75 to 1.3.

With a water-based ink prepared with the modified carbon black for which the respective values of the specific surface area divided by the DBP oil absorption (specific surface area/DBP oil absorption), and the ratio of the mean particle diameter to the primary particle diameter (mean particle diameter/primary particle diameter) for the carbon black are in the above ranges, dense printing with a deep black color is possible. On the other hand, with an ink prepared with a modified carbon black for which these ranges are deviated from, the black color will be shallow, and printing with a deep black color will not be possible.

The BET specific surface area (m$^2$/g) divided by the DBP oil absorption (mL/100 g) is 0.75 to 1.3, more preferably 0.9 to 1.1.

The ratio of the mean particle diameter to the primary particle diameter for the carbon black corresponds to the average number of aggregated primary particles contained per carbon black agglomerated mass (agglomerate) in which primary particles are agglomerated together. Preparing a modified carbon black for which the ratio of the mean particle diameter to the primary particle diameter is at least 8.5 is important for simultaneously obtaining the desired settling rate and OD value. The ratio of the mean particle diameter to the primary particle diameter is more preferably 8.5 to 15.0, yet more preferably 9.0 to 12.0.

With an ink prepared with a modified carbon black for which the primary particle diameter is within such a range, even if the mean particle diameter is 150 to 250 nm, the settling rate will be low, clogging of the ink ejection nozzles of an ink jet printer will not be prone to being brought about, and settling, degeneration and so on will not be prone to occurring, and in actual practice the ink will have long-term storage stability of several years.

The range of the primary particle diameter is 11 to 18 nm, more preferably 15 to 18 nm. If a carbon black having a larger primary particle diameter than this is used, then compared with a carbon black having a primary particle diameter within this range, the settling rate of a prepared ink will be increased dramatically by several times to several tens of times, and clogging or degeneration upon long-term storage will become prone to occurring. On the other hand, if a carbon black having a smaller primary particle diameter than this is used, then there will be no problem with the settling rate of the ink, but the viscosity will become high, and hence manufacture of the modified carbon black and printing with the ink will become difficult.

A modified carbon black that enables the preparation of a water-based ink having good long-term storage stability is obtained by carrying out suitable oxidation treatment on a raw material carbon black, and preferably has an amount of lactone groups of at least 500 μmol/g, and an amount of carboxyl groups of at least 700 μmol/g, relative to the weight of carbon black. Lactone groups and carboxyl groups are hydrophilic functional groups, and hence the interaction between the modified carbon black and water is strengthened, and electrostatic repulsion acts between the modified carbon black particles. The greater the number of these hydrophilic functional groups, the greater the repulsion, and hence the more readily the modified carbon black is dispersed in water, whereby settling becomes less prone to occurring.

The modified carbon black of embodiment A exhibits a settling rate of not more than 30%. The settling rate is measured as follows.

30 g of a liquid prepared to 5 wt % of the modified carbon black, 10 wt % of glycerol and 10 wt % of diethylene glycol mono-n-butyl ether is sealed in a settling tube, and centrifugation is carried out for 10 minutes with a gravity acceleration of 11000 G. 4 g of the supernatant is weighed out accurately, and is diluted in a 1 L measuring flask. The diluted liquid is measured out into a 5 mL transfer pipette, and is diluted in a 100 mL measuring flask. The absorbance $W1$ of this liquid at a wavelength of 500 nm is measured. The absorbance $W0$ upon similarly diluting the prepared liquid before centrifugation is measured, and the settling rate is calculated from the formula Settling rate (%)=[1−(absorbance $W1$)/(absorbance $W0$)]×100

The settling rate obtained under the above conditions using the modified carbon black of embodiment A exhibits a low value of not more than 30%. As a result, even if for example the mean particle diameter of the modified carbon black is relatively large as with the previously mentioned range, a carbon black dispersion or water-based ink containing the modified carbon black having such a settling rate will be stable, with degeneration not being prone to occur and settling not occurring even upon long-term storage for several years. Moreover, in the case of using such a water-based ink in an ink jet printer, smooth printing will be possible, with clogging of the ink ejection nozzles of the ink jet printer not being brought about. Furthermore, such a dispersion or ink has a high OD value, and hence dense printing and so on with a deep black color is possible. The settling rate is more preferably not more than 25%. On the other hand, with an ink using a carbon black exhibiting a settling rate exceeding the above-mentioned range, clogging or settling upon long-term storage will occur.

The absorbance at 500 nm of a liquid prepared to a modified carbon black concentration of 0.001 wt % is preferably at least 0.47. If a modified carbon black for which the absorbance is in such a range is used in a water-based ink, then printing with a deep black color can be carried out. If a carbon black for which the absorbance is outside this range is used, then printing with a brownish black color will be carried out.

A method of manufacturing the modified carbon black has, for example, at least the steps of adding an aqueous solution of a hypohalous acid and/or a hypohalite to a liquid obtained by suspending a carbon black raw material powder prepared using the furnace method in water and thus carrying out oxidation treatment, stirring in a disperser with a 0.6 to 3 mm-diameter milling medium, filtering with 100 to 500 mesh wire netting, and desalinizing the filtrate using an ultrafilter membrane.

The carbon black raw material powder is manufactured using a publicly known carbon black manufacturing method, with examples being a carbon black obtained using a furnace method, carbon black obtained using a channel method, and so on. The furnace method is a raw material powder preparation method in which a fuel (gas or oil) and air are introduced into a special combustion furnace lined with bricks able to withstand high temperatures of up to approximately 2000° C., complete combustion is carried out and a high-temperature atmosphere of at least 1400° C. is formed, and then a liquid raw material oil is continuously sprayed in and pyrolyzed, water is sprayed onto the high-temperature gas containing carbon black produced at a latter stage in the furnace to stop the reaction, and then separation into the carbon black and exhaust gas is carried out using a bag filter.

To oxidize the carbon black, for example the following methods can be used: an oxidation method using contact with air, a gas phase oxidation method using reaction with a nitrogen oxide or ozone, a liquid phase oxidation method using an oxidizing agent such as nitric acid, potassium permanganate, potassium dichromate, chlorous acid, perchloric acid, a hypohalite, hydrogen peroxide, a bromine aqueous solution or an ozone aqueous solution, and so on. The surface may be modified through plasma treatment or the like.

A particularly preferable method is a method in which the carbon black is subjected to wet oxidation using a hypohalite. Specific examples of the hypohalite are sodium hypochlorite and potassium hypochlorite, with sodium hypochlorite being particularly preferable from the standpoint of the reactivity.

By using a hypohalous acid or a hypohalite as the oxidizing agent, the surface of the carbon black raw material powder is oxidized, and lactone groups, carboxyl groups and so on are introduced. From the standpoint of the reactivity, an aqueous solution of sodium hypochlorite is particularly preferable. The amount used of the hypohalous acid or hypohalite is adjusted in accordance with the BET specific surface area of the carbon black raw material powder. The lower the BET specific surface area, the lower the amount of the hypohalous acid or hypohalite is made to be, and the greater the BET specific surface area, the greater the amount of the hypohalous acid or hypohalite is made to be. This is because the lower the specific surface area, the fewer the active sites that will react with the hypohalous acid, whereas the greater the specific surface area, the greater the active sites that will react with the hypohalous acid. There will be no impediment to the reaction even if the hypohalous acid is added in an excess relative to the number of active sites, but the hypohalous acid will be used wastefully, and it will become necessary to carry out extra desalination. If the reaction is carried out with an amount of hypohalous acid that is a shortfall relative to the number of active sites, then the desired amount of lactone groups and amount of carboxyl groups will not be reached, and hence the settling rate will worsen. As a result of carrying out studies focusing on the effective halogen concentration in the hypohalous acid or hypohalite and the surface area of the carbon black, it was found that if the oxidation is carried out with the hypohalous acid or hypohalite having a chlorine amount of $0.6 \times 10^{-4}$ to $2.5 \times 10^{-4}$ mol, preferably $0.6 \times 10^{-4}$ to $1.5 \times 10^{-4}$ mol, per unit surface area (m$^2$) of the carbon black, then the oxidation treatment can be carried out well.

In the step of suspending the carbon black raw material powder in water, so that it will be possible to carry out the oxidation step suitably, it is important to mix the carbon black into the water sufficiently. A high-load disperser, high-speed stirrer or the like can be used. Alternatively, it is possible to use a water-soluble solvent in advance, and impregnate the solvent into the carbon black, or carry out the dispersion in a water/water-soluble solvent mixed system.

In the manufacturing step of subjecting the carbon black to the oxidation treatment and dispersing/pulverizing, a ball mill, an attritor, a flow-jet mill, an impeller mill, a colloidal mill, a sand mill (e.g. one commercially sold under the trade name 'Super Mill', 'Agitator Mill', 'Dyno-mill' or 'Beads Mill') or the like can be used as a disperser/pulverizer. A milling medium does not necessarily have to be used, but is preferably used, with an example being a 0.6 to 3 mm-diameter milling medium. As such a milling medium, glass beads, zirconia beads, magnetic beads, stainless steel beads or the like can be used; the treatment conditions in the step of dispersing while oxidizing are preferably 3 to 10 hours at 10 to 70° C. with a rotational speed of at least 500 rpm. The reaction will proceed more readily if the reaction temperature is high, but if the temperature is too high then the hypohalous acid will decompose, and hence 40 to 60° C. is preferable for the reaction.

The dispersion obtained is filtered with 100 to 500 mesh wire netting to remove coarse particles together with the milling medium.

The desalination of the filtrate obtained by filtering with the wire netting is carried out, for example, using an ultrafilter membrane until the electrical conductivity is less than 1.5 mS/cm. If the desalination is stopped at above 1.5 mS/cm, then impurities such as NaCl will be contained in the ink, and hence the storage stability will become poor.

Next, after the desalination, using a centrifuge or a filter, coarse particles of size greater than 1 μm are removed. Coarse particles readily settle whereby the settling rate increases, and cause clogging of the ink ejection nozzles of an ink jet printer, and hence it is important to remove the coarse particles.

pH adjustment of the dispersion obtained, and neutralization of water-soluble acidic groups obtained through the oxidation can be carried out. Examples of the basic substance used in this are alkali metal hydroxides (e.g. sodium hydroxide, potassium hydroxide, lithium hydroxide etc.), ammonia (water), and various amine compounds.

Examples of preferable amine compounds include water-soluble volatile amines and alkanolamines. Specific examples include volatile amines substituted with alkyl groups having 1 to 3 carbon atoms (e.g. methylamine, trimethylamine, diethylamine, propylamine); alkanolamines substituted with alkanol groups having 1 to 3 carbon atoms (e.g. ethanolamine, diethanolamine, triethanolamine, triisopropanolamine etc.); and alkylalkanolamines substituted with alkyl groups having 1 to 3 carbon atoms and alkanol groups having 1 to 3 carbon atoms.

A carbon black dispersion of embodiment A is characterized by comprising a dispersion of a modified carbon black as described above in water. The carbon black is a carbon black that can be dispersed and/or dissolved without a dispersant, and hence the carbon black dispersion can be obtained by adding water to the carbon black and/or carrying out concentration, thus adjusting to the desired carbon black concentration. Moreover, if necessary, freely chosen additives such as preservatives and water-soluble organic solvents as described later can be added.

A water-based ink of embodiment A is characterized by containing at least a modified carbon black as described above. Through containing the carbon black, high-quality dense printing with a vivid deep black color is made possible with the water-based ink. Furthermore, the storage stability is good, with settling not being prone to occurring even upon long-term storage. The carbon black is generally contained in a range of 0.1 to 20 wt %, preferably 1 to 15 wt %, relative to the total amount of the water-based ink. At a carbon black content of less than 0.1 wt %, the printing or writing density may be insufficient, whereas if this content exceeds 20 wt %, then the viscosity of the water-based ink will increase dramatically, and hence there will be a risk of the stability during ink ejection dropping.

Moreover, the water-based ink of embodiment A is further characterized by having a penetrability such that the penetration time upon applying the ink onto a recording medium in an amount of 1 mg/cm$^2$ is less than 1 second. Specifically, an ink for which the penetration time upon applying the ink in an amount of 1 mg/cm$^2$ is less than 1 second means a water-based ink for which, for example, in the case of applying 50 ng of the water-based ink onto a 360 dpi (dot/inch)×360 dpi area, the time until there is no longer any soiling with ink upon touching the printed surface is less than 1 second.

With such an ink, penetration promoter(s) such as surfactant(s) and/or water-soluble organic solvent(s) according to which the surface tension of an aqueous solution is lowered is/are added, thus improving the wettability of the ink to the recording medium and hence increasing the penetrability. Examples of water-soluble organic solvents are lower alcohols such as ethanol and propanol; cellosolves such as ethylene glycol monomethyl ether and ethylene glycol monoethyl ether; carbitols such as diethylene glycol monomethyl ether and diethylene glycol monoethyl ether; and 1,2-alkyldiols such as 1,2-hexanediol and 1,2-octanediol. Of these, glycol butyl ether type aqueous organic solvents such as diethylene glycol monobutyl ether and triethylene glycol monobutyl ether are particularly preferable in the sense of giving excellent penetrability.

Moreover, as surfactants, anionic surfactants such as fatty acid salts and alkylsulfuric acid ester salts, nonionic surfactants such as polyoxyethylene alkyl ethers and polyoxyethylene phenyl ethers, cationic surfactants, amphoteric surfactants, and so on can be used. Of these, nonionic surfactants are particularly preferable due to causing little foaming, and furthermore acetylene glycol type surfactants are particularly preferable in the sense of giving excellent penetrability.

It is preferable to add such penetration promoter(s), using water-soluble organic solvent(s) or surfactant(s) alone or both together, such as to adjust the surface tension of the ink at 20° C. to not more than 45 mN/m, preferably not more than 40 mN/m.

A humectant may be added to the water-based ink of embodiment A, this being for example to prevent the ink from drying at the tips of the nozzles from which the ink is ejected in the case of using the ink in ink jet recording. The humectant is selected from materials having high hygroscopicity and water-solubility; a polyol such as glycerol, ethylene glycol, diethylene glycol, triethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol or pentaerythritol, a lactam such as 2-pyrrolidone, N-methyl-2-pyrrolidone or ε-caprolactam; a urea compound such as urea, thiourea, ethyleneurea or a 1,3-dimethylimidazolidinone, or a saccharide such as maltitol, sorbitol, gluconolactone or maltose can be used. There are no particular limitations on the amount used of the humectant, but in general this amount is in a range of 0.5 to 50 wt %.

In addition to the above, the water-based ink may contain additives such as general fixing agents, pH adjusters, antioxidants, ultraviolet absorbers, preservatives and anti-mold agents as required.

A water-based ink containing the modified carbon black enables high-quality dense printing with a deep black color. For example, in the case of applying 1 mg/cm$^2$ of a water-based ink prepared to 5 wt % of the modified carbon black, 10 wt % of glycerol and 10 wt % of diethylene glycol mono-n-butyl ether, the reflection density (OD value) upon subjecting the ink layer to measurement with a Macbeth densitometer is at least 1.4.

Moreover, upon printing with a water-based ink prepared with the above mixing proportions, the L* value in the L*a*b* color system is less than 47, and the b* value is 0.7 to 0; if the L*a*b* color system values are in such ranges, then upon printing the color is a deep black with no blueness or redness equivalent to an extent that is indistinguishable upon observation with the naked eye. Moreover, the absorbance and the reflection density of the water-based ink are in the above ranges, and the higher these are, the lower the L* value and the b* value and the better.

The water-based ink of embodiment A can be used as any of various inks for writing instruments, for stamps or the like. In particular, in the case of use as a writing ink composition for water-based ball pens or the like, the recording/writing properties are good, and writing with no unevenness in the written marks is possible, and moreover there is no patchiness of the characters in the case of writing rapidly. The water-based ink of embodiment A can yet more suitably be used as an ink for ink jet recording in which recording is carried out by ejecting droplets of the ink and attaching the droplets onto a recording medium.

Regarding an ink jet recording method of embodiment A, any method in which the ink is ejected as droplets from fine nozzles and the droplets are attached onto a recording medium can be used.

Several of these methods will now be described. First, there is an electrostatic attraction method. In this method, a strong electric field is applied between the nozzles and accelerating electrodes placed in front of the nozzles, thus continuously ejecting the ink from the nozzles as droplets; there are a form in which recording is carried out by applying printing information signals to deflecting electrodes while the ink droplets are flying between the deflecting electrodes, and alternatively a form in which the ink droplets are not deflected but rather are ejected out in correspondence with printing information signals.

A second method is a method in which pressure is applied to ink droplets with a small pump, and the nozzles are mechanically vibrated using a quartz oscillator or the like, thus forcibly ejecting the ink droplets. The ejected ink droplets are charged at the same time as being ejected, and printing information signals are applied to deflecting electrodes while the ink droplets are flying between the deflecting electrodes, thus carrying out recording.

A third method is a method using a piezoelectric element, this being a method in which pressure and printing information signals are simultaneously applied to the ink by the piezoelectric element, thus ejecting ink droplets and carrying out recording.

A fourth method is a method in which the ink is subjected to rapid volume expansion through the action of thermal energy, this being a method in which the ink is heated to form bubbles by microelectrodes in accordance with printing information signals, thus ejecting ink droplets and carrying out recording.

Any of the above methods can be used in the ink jet recording method using the water-based ink of embodiment A.

A recorded article of embodiment A is obtained through recording being carried out using at least a water-based ink as described above. This recorded article exhibits high printing density due to the water-based ink of embodiment A being used.

As described in detail above, the modified carbon black of embodiment A can be mass-produced simply, and can be dispersed in water even if a dispersant or surfactant is not used. A dispersion having this carbon black dispersed therein has low viscosity, this being because a dispersant is not required, and is thus suitable for use in a low-viscosity water-based ink.

In particular, such a water-based ink is suitable for use in ink jet printers. The ink has good storage stability, with settling not being prone to occur even upon long-term storage, and hence has a long quality retention period. Moreover, clogging of the ink ejection nozzles of an ink jet printer is not prone to being brought about. Furthermore, if this ink is used, then high-quality dense printing with a vivid deep black color is possible.

Embodiment B

A modified carbon black of embodiment B is a modified carbon black that can be dispersed and/or dissolved in water without a dispersant. In embodiment B, a carbon black that can be dispersed and/or dissolved in water without a dispersant is a carbon black that can be dispersed and/or dissolved in an aqueous medium without a dispersant due to a large number of hydrophilic functional groups and/or salts thereof (hereinafter referred to as 'dispersibility-bestowing groups') being bonded to the pigment surface either directly or indirectly via alkyl groups, alkyl ether groups or aryl groups. Here, 'dispersed or dissolved in an aqueous medium without a dispersant' refers to a state in which the carbon black exists stably with a minimum particle diameter such that dispersion is possible in an aqueous medium even if a dispersant is not used. Here, 'a minimum particle diameter such that dispersion is possible' refers to the carbon black diameter for which further reduction is not possible even if the dispersion time is increased. Examples of the dispersibility-bestowing groups bonded to the surface of the carbon black include carboxyl groups, lactone groups, carbonyl groups, hydroxyl groups, sulfone groups, phosphoric acid groups, quaternary ammonium groups, and salts thereof. In the present specification, such a modified carbon black that can be dispersed and/or dissolved in water without a dispersant is sometimes referred to as a 'self-dispersing carbon black'.

In the case that the self-dispersing carbon black is used in a dispersion or water-based ink, there is no need to include a dispersant that would be included to disperse an ordinary pigment, and hence there is virtually no defoaming reduction or foaming which would be caused by a dispersant, and thus handling is easy, and moreover in the case of use in printing a water-based ink having excellent printing stability can easily be prepared. Moreover, not only is the degree of blackness of the carbon black itself high, but also a large increase in viscosity that would be caused by a dispersant is suppressed, and hence the pigment can be contained in a large amount, and thus the OD value can be further increased.

The carbon black of embodiment B is characterized in that the relationships $10 \leq S_A-S_B \leq 50$ and $S_B \leq 40$ hold, wherein $S_A$ is the settling rate (%) for a dispersion A prepared to 13 wt % of the carbon black and 87 wt % of water, and SB is the settling rate (%) for a dispersion B prepared to 5 wt % of the carbon black, 10 wt % of glycerol, 10 wt % of diethylene glycol mono-n-butyl ether and 75 wt % of water.

Moreover, it is more preferable for the relationships $20 \leq S_A-S_B \leq 50$ and $S_B \leq 30$ to hold.

In the present specification, the settling rate means the value determined as follows.

30 g of a dispersion prepared from the carbon black by mixing with the prescribed composition ratio is sealed in a settling tube, and centrifugation is carried out for 10 minutes with a gravity acceleration of 11000 G. 4 g of the supernatant is weighed out accurately, and is diluted in a 1 L measuring flask. The diluted liquid is measured out into a 5 mL transfer pipette, and is diluted in a 100 mL measuring flask. The absorbance W1 of this liquid at a wavelength of 500 nm is measured. The absorbance W0 upon similarly diluting the prepared liquid before centrifugation is measured, and the settling rate is calculated from the formula Settling rate (%)=[1−(absorbance $W$1)/(absorbance $W$0)]×100

The modified carbon black of embodiment B is characterized in that the difference between the settling rates $S_A$ and $S_B$ for the dispersions prepared with the different compositions is in a range of 10 to 50, more preferably 20 to 50, and the settling rate $S_B$ for the dispersion B is not more than 40, more preferably not more than 30. If the $S_A-S_B$ value is less than 10, then to obtain a high OD value, it is necessary to select a carbon black having a large particle diameter and thus a high settling rate, but in this case, due to the high settling rate, serious problems such as clogging of ink ejection nozzles or degeneration upon leaving for a long period may occur. Moreover, if a carbon black for which the SA-SB value is less than 10 and the settling rate is low is selected, then problems such as clogging of ink ejection nozzles or degeneration upon leaving for a long period will become less prone to occur, but the OD value of a printed article will be low, with the color becoming a yellowish/reddish black. In contrast with this, in the case of making the modified carbon black of embodiment B satisfying the above conditions into a dispersion or water-based ink and carrying out printing, a deep black color, and a high OD value can be realized. Moreover, for a modified carbon black within the above scope, in actual use, settling is not prone to occurring, and hence in the case of using in a dispersion or water-based ink, even upon long-term storage for several years, the dispersion or water-based ink will be stable, with degeneration not being prone to occurring. Moreover, in the case of using in an ink jet printer, clogging of the ink ejection nozzles of the ink jet printer will not be prone to being brought about, and hence smooth printing will be possible.

The carbon black of embodiment B is characterized in that the 50% cumulative diameter as measured with a dispersion prepared to a concentration of the carbon black of 0.3 g/L is in a range of 150 to 350 nm. Moreover, the 50% cumulative diameter is more preferably in a range of 150 to 250 nm.

In the present specification, the 50% cumulative diameter refers to the value determined as follows. 2.3 g of a dispersion A prepared to 13 wt % of the carbon black and 87 wt % of water is accurately weighed out, and diluted in a 1 L measuring flask. The resulting diluted dispersion is subjected to particle size distribution measurement using a device such as a Microtrac 9340-UPA (trade name, made by Microtrac) particle size analyzer, and the particle diameter when the cumulative frequency becomes 50% is determined.

In the case of making a modified carbon black for which the 50% cumulative diameter is within the above range into a dispersion or water-based ink and carrying out printing, a deep black color, and a high OD value can be realized. On the other hand, with a carbon black for which the 50% cumulative diameter is outside the above range, the black color may be shallow, and printing with a deep black color may not be possible.

The modified carbon black of embodiment B is preferably a modified carbon black obtained by carrying out surface modification on a carbon black having a primary particle diameter of 11 to 18 nm, a BET specific surface area of at least 180 m² μg, a DBP oil absorption of at least 180 mL/100 g, and a value of the BET specific surface area (m²/g) divided by the DBP oil absorption (mL/100 g) of 0.75 to 1.3. Moreover, the value of the BET specific surface area (m²/g) divided by the DBP oil absorption (mL/100 g) is more preferably 0.9 to 1.1.

In the case of carrying out surface modification on a carbon black having properties within the above ranges, the relationship between the settling rates $S_A$ and $S_B$ will become within the preferable range described earlier, and moreover it will be easy to prepare a self-dispersing carbon black for which the 50% cumulative diameter is within the preferable range described earlier.

The self-dispersing carbon black of embodiment B is manufactured, for example, by carrying out physical treatment or chemical treatment on a carbon black, thus bonding (grafting) dispersibility-bestowing groups as described earlier or active species having such dispersibility-bestowing groups onto the pigment surface.

Examples of the above-mentioned physical treatment include vacuum plasma treatment. Moreover, examples of the above-mentioned chemical treatment include an oxidation method using contact with air, a gas phase oxidation method using reaction with a nitrogen oxide or ozone, a wet oxidation method in which the pigment surface is oxidized in water using an oxidizing agent such as nitric acid, potassium permanganate, potassium dichromate, chlorous acid, perchloric acid, a hypohalite, hydrogen peroxide, a bromine aqueous solution or an ozone aqueous solution, and a method in which p-aminobenzoic acid or the like is bonded onto the pigment surface, whereby dispersibility-bestowing groups are bonded on via phenyl groups or the like.

A particularly preferable method in embodiment B is a method in which the carbon black is subjected to wet oxidation using a hypohalite. Regarding the details of this method, the description in embodiment A may be applied as appropriate.

A preferable method of manufacturing the modified carbon black of embodiment B has, for example, at least the steps of adding an aqueous solution of a hypohalous acid and/or a hypohalite to a liquid obtained by suspending a carbon black raw material powder prepared using the furnace method in water and thus carrying out oxidation treatment, stirring using a disperser with a 0.6 to 3 mm-diameter milling medium, filtering with 100 to 500 mesh wire netting, and desalinizing the filtrate using an ultrafilter membrane.

The various steps in this manufacturing method (the step of suspending the carbon black raw material powder in water, the manufacturing step of subjecting the carbon black to the oxidation treatment and dispersing/pulverizing, etc.) are as described in embodiment A, and the details therein may be applied as appropriate.

A carbon black dispersion of embodiment B is characterized by comprising a dispersion of a self-dispersing carbon black as described above in water. The carbon black is a carbon black that can be dispersed and/or dissolved without a dispersant, and hence the carbon black dispersion can be obtained by adding water to the carbon black and/or carrying out concentration, thus adjusting to the desired carbon black concentration. Moreover, if necessary, freely chosen additives such as preservatives and water-soluble organic solvents as described later can be added.

A water-based ink of embodiment B is characterized by containing at least a modified carbon black as described above. Through containing the carbon black, high-quality dense printing with a vivid deep black color is made possible with the water-based ink. Furthermore, the storage stability is good, with settling not being prone to occurring even upon long-term storage. The carbon black is generally contained in a range of 0.1 to 20 wt %, preferably 1 to 15 wt %, relative to the total amount of the water-based ink. At a carbon black content of less than 0.1 wt %, the printing or writing density may be insufficient, whereas if this content exceeds 20 wt %, then the viscosity of the water-based ink will increase dramatically, and hence there will be a risk of the stability during ink ejection dropping.

The water-based ink of embodiment B particularly preferably further contains glycerol and a glycol ether compound. Of glycol ether compounds, one selected from glycol butyl ether compounds such as diethylene glycol mono-n-butyl ether, triethylene glycol mono-n-butyl ether, triethylene glycol mono-tert-butyl ether and hexylene glycol mono-n-butyl ether is particularly preferable, this being from the standpoint of it being easy to give the ink penetrability effectively. As described above, with the modified carbon black of embodiment B, the settling rate for a dispersion containing glycerol and diethylene glycol mono-n-butyl ether is not more than a certain value, and hence for a water-based ink containing glycerol and a glycol ether compound as described above, a substantially low settling rate is secured, while an appropriate penetrability and reliability, and a high OD value can be realized.

Moreover, as with embodiment A, the water-based ink of embodiment B is further characterized by having a penetrability such that the penetration time upon applying the ink onto a recording medium in an amount of 1 mg/cm$^2$ is less than 1 second.

With such an ink, penetration promoter(s) such as surfactant(s) and/or water-soluble organic solvent(s) according to which the surface tension of an aqueous solution is lowered is/are added, thus improving the wettability of the ink to the recording medium and hence increasing the penetrability. Compounds suitable in embodiment B as surfactants and water-soluble organic solvents are as with the compounds given earlier as examples suitable in embodiment A.

It is preferable to add such penetration promoter(s), using water-soluble organic solvent(s) or surfactant(s) alone or both together, such as to adjust the surface tension of the ink at 20° C. to not more than 45 mN/m, preferably not more than 40 mN/m.

A humectant or the like may be added to the water-based ink of embodiment B, this being for the same reason as in the case of embodiment A described earlier; examples of the humectant and the amount used are as described in embodiment A, and the details therein may be applied as appropriate.

As with embodiment A described earlier, in addition to the above, the water-based ink of embodiment B may contain additives such as general fixing agents, pH adjusters, antioxidants, ultraviolet absorbers, preservatives and anti-mold agents as required.

A water-soluble resin, an aqueous emulsion, aqueous polymer fine particles, or the like may be used as a fixing agent. Examples of water-soluble resins include water-soluble rosins, alginic acid compounds, polyvinyl alcohol, hydroxypropylcellulose, carboxymethylcellulose, hydroxyethylcellulose, methylcellulose, styrene/acrylic acid resins, styrene/acrylic acid/acrylic ester resins, styrene/maleic acid resins, styrene/maleic acid semi-ester resins, acrylic aid/acrylic ester resins, isobutylene/maleic acid resins, rosin-modified maleic acid resins, polyvinylpyrrolidone, gum arabic, starches, polyallylamine, polyvinylamine, and polyethyleneimine. Examples of aqueous emulsion and aqueous polymer fine particles include styrene/acrylic acid emulsions, and acrylic acid emulsions.

As pH adjusters, ones that have been used in water-based ink compositions hitherto with an aim of setting the pH to be within a specific range can be used. Specifically, alkali metal hydroxides such as lithium hydroxide, potassium hydroxide and sodium hydroxide, ammonia, amines such as triethanolamine, triisopropanolamine and diethanolamine, and so on can be used. As pH buffering agents, ones that have been used in water-based ink compositions hitherto with an aim of maintaining the pH within a specific range can be used. Specifically, collidine, imidazole, phosphoric acid, 3-(N-morpholino)propanesulfonic acid, tris(hydroxymethyl)aminomethane, boric acid and so on can be used.

Examples of antioxidants and ultraviolet absorbers include allophanates such as allophanate and methyl allophanate, biuret compounds such as biuret, dimethylbiuret and tetramethylbiuret, L-ascorbic acid and salts thereof, and Tinuvin 328, 900, 1130, 384, 292, 123, 144, 622 and 770, Irgacor 252 and 153, and Irganox 1010, 1076, 1035 and MD1024 manufactured by Ciba-Geigy, and also lanthanide oxides.

Preservatives and anti-mold agents can be selected, for example, from sodium benzoate, pentachlorophenyl sodium, sodium 2-pyridinethiol-1-oxide, sodium sorbate, sodium dehydroacetate and 1,2-dibenzisothiazolin-3-one (Proxel CRL, Proxel BDN, Proxel GXL, Proxel XL-2 and Proxel TN manufactured by Avecia).

As with embodiment A described earlier, the water-based ink of embodiment B can be used as any of various inks for writing instruments, for stamps, for ink jet printing or the like. In particular, preferable modes and effects are as with the water-based ink of embodiment A.

Regarding an ink jet recording method of embodiment B, any method in which the ink is ejected as droplets from fine nozzles and the droplets are attached onto a recording medium can be used. Examples of several of these methods are as with embodiment A described above, and the description in embodiment A may also be applied to embodiment B.

Any of these methods can be used in the ink jet recording method using the water-based ink of embodiment B.

A recorded article of embodiment B is obtained through recording being carried out using at least a water-based ink as described above. This recorded article exhibits high printing density due to the water-based ink of embodiment B being used.

As described in detail above citing as examples embodiment A and embodiment B as preferable embodiments, a modified carbon black of the present invention can be mass-produced simply, and can be dispersed in water even if a dispersant or surfactant is not used. A dispersion having this carbon black dispersed therein has low viscosity, this being because a dispersant is not required, and is thus suitable for use in a low-viscosity water-based ink.

In particular, such a water-based ink is suitable for use in ink jet printers. The ink has good storage stability, with settling not being prone to occur even upon long-term storage, and hence has a long quality retention period. Moreover, clogging of the ink ejection nozzles of an ink jet printer is not prone to being brought about. Furthermore, if this ink is used, then high-quality dense printing with a vivid deep black color is possible.

EXAMPLES

Following is a detailed description of examples of modified carbon blacks, and carbon black dispersions and water-based inks containing these modified carbon blacks according to the present invention. The present invention is not limited whatsoever by these examples.

Examples A

Preparation of Carbon Black Dispersion a (Carbon Black for which Embodiment A Applied)

200 g of a carbon black raw material powder prepared using the furnace method having a primary particle diameter of 18 nm, a BET specific surface area of 185 $m^2$ µg, a DBP oil absorption of 200 mL/100 g, and BET specific surface area/DBP oil absorption=0.93 was added into 1500 g of ion exchange water, and the temperature was raised to 50° C. while stirring using a dissolver. After that, an aqueous solution of 2220 g of sodium hypochlorite (effective halogen concentration 12%) was instilled in over 3.5 hours at 50 to 60° C., and immediately after the instillation had been completed glass beads of diameter 3 mm were added, and stirring was carried out for 30 minutes at 50° C., thus obtaining a reaction liquid containing modified carbon black. This reaction liquid was filtered using 400 mesh wire netting, thus separating the glass beads and unreacted carbon black from the reaction liquid. A sodium hydroxide 5% aqueous solution was added to the reaction liquid obtained through the separation to adjust the pH to 7.5, desalination and purification were carried out using an ultrafilter membrane until the electrical conductivity reached 1.5 mS/cm, and concentration was further carried out until the modified carbon black concentration became 17 wt %. The concentrated liquid was centrifuged, coarse particles were removed, and filtration was carried out with a 0.6 µm filter. Ion exchange water was added to the filtrate obtained, thus diluting until the modified carbon black concentration became 15 wt %, and dispersion was carried out.

Preparation of Carbon Black Dispersion b (Carbon Black for which Embodiment A Applied)

500 g of a carbon black raw material powder prepared using the furnace method having a primary particle diameter of 16 nm, a BET specific surface area of 220 $m^2$/g, a DBP oil absorption of 230 mL/100 g, and BET specific surface area/DBP oil absorption=0.96 was added into 3750 g of ion exchange water, and the temperature was raised to 50° C. while stirring using a dissolver. After that, an aqueous solution of 6600 g of sodium hypochlorite (effective halogen concentration=12%) was instilled in over 3.5 hours at 50 to 60° C. while pulverizing with a sand mill using zirconia beads of diameter 0.8 mm, and then the pulverization with the sand mill was continued for a further 30 minutes, thus obtaining a reaction liquid containing modified carbon black. This reaction liquid was filtered using 400 mesh wire netting, thus separating the zirconia beads and unreacted carbon black from the reaction liquid. A potassium hydroxide 5% aqueous solution was added to the reaction liquid obtained through the separation to adjust the pH to 7.5, desalination and purification were carried out using an ultrafilter membrane until the electrical conductivity reached 1.5 mS/cm, and concentration was further carried out until the modified carbon black concentration became 17 wt %. The concentrated liquid was centrifuged, coarse particles were removed, and filtration was carried out with a 0.6 µm filter. Ion exchange water was added to the filtrate obtained, thus diluting until the modified carbon black concentration became 15 wt %, and dispersion was carried out.

Preparation of Carbon Black Dispersion c (Carbon Black for which Embodiment A Applied)

500 g of a carbon black raw material powder prepared using the furnace method having a primary particle diameter of 17 nm, a BET specific surface area of 200 $m^2$/g, a DBP oil absorption of 220 mL/100 g, and BET specific surface area/DBP oil absorption=0.91 was added into 3750 g of ion exchange water, and the temperature was raised to 50° C. while stirring using a dissolver. After that, an aqueous solution of 6000 g of sodium hypochlorite (effective halogen concentration=12%) was instilled in over 3.5 hours at 50 to 60° C. while pulverizing with a sand mill using zirconia beads of diameter 0.8 mm, and then the pulverization with the sand mill was continued for a further 30 minutes, thus obtaining a reaction liquid containing modified carbon black. This reaction liquid was filtered using 400 mesh wire netting, thus separating the zirconia beads and unreacted carbon black from the reaction liquid. A sodium hydroxide 5% aqueous solution was added to the reaction liquid obtained through the separation to adjust the pH to 7.5, desalination and purification were carried out using an ultrafilter membrane until the electrical conductivity reached 1.5 mS/cm, and concentration was further carried out until the modified carbon black concentration became 17 wt %. The concentrated liquid was centrifuged, coarse particles were removed, and filtration was carried out with a 0.6 µm filter. Ion exchange water was added to the filtrate obtained, thus diluting until the modified carbon black concentration became 15 wt %, and dispersion was carried out.

Example A1

Water-Based Ink 32.7 g of ion exchange water, 7 g of glycerol, and 7 g of diethylene glycol mono-n-butyl ether were added to 23.3 g of carbon black dispersion a, stirring was carried out, and filtration was carried out using a Membrane Filter (trade name, made by Millipore) made of polytetrafluoroethylene with a pore size of 5 µm, thus preparing a water-based ink of Example A1.

Example A2

Water-based Ink 26.8 g of ion exchange water, 7 g of glycerol, 2.1 g of triethylene glycol mono-n-butyl ether, 0.7 g of Olfine E1010 (trade name, made by Nissin Chemical Industry Co., Ltd.), and 0.7 g of triethanolamine were added to 32.7 g of carbon black dispersion a, stirring was carried out, and filtration was carried out using a Membrane Filter (trade name, made by Millipore) made of polytetrafluoroethylene with a pore size of 5 µm, thus preparing a water-based ink of Example A2.

Example A3

Water-based Ink 32.7 g of ion exchange water, 7 g of glycerol, and 7 g of diethylene glycol mono-n-butyl ether were added to 23.3 g of carbon black dispersion b, stirring was carried out, and filtration was carried out using a Membrane Filter (trade name, made by Millipore) made of polytetrafluoroethylene with a pore size of 5 µm, thus preparing a water-based ink of Example A3.

Example A4

Water-based Ink 27.4 g of ion exchange water, 7 g of glycerol, 2.1 g of triethylene-glycol mono-n-butyl ether, 0.1 g of Olfine STG (trade name, made by Nissin Chemical Industry Co., Ltd.), and 0.7 g of triethanolamine were added to 32.7 g of carbon black dispersion b, stirring was carried out, and filtration was carried out using a Membrane Filter (trade name, made by Millipore) made of polytetrafluoroethylene with a pore size of 5 µm, thus preparing a water-based ink of Example A4.

Example A5

Water-based Ink 32.7 g of ion exchange water, 7 g of glycerol, and 7 g of diethylene glycol mono-n-butyl ether were added to 23.3 g of carbon black dispersion c, stirring was carried out, and filtration was carried out using a Membrane Filter (trade name, made by Millipore) made of polytetrafluoroethylene with a pore size of 5 µm, thus preparing a water-based ink of Example A5.

Example A6

Water-based Ink 26.8 g of ion exchange water, 7 g of glycerol, 2.1 g of triethylene glycol mono-n-butyl ether, 0.7 g of Olfine E1010 (trade name, made by Nissin Chemical Industry Co., Ltd.), and 0.7 g of triethanolamine were added to 32.7 g of carbon black dispersion c, stirring was carried out, and filtration was carried out using a Membrane Filter (trade name, made by Millipore) made of polytetrafluoroethylene with a pore size of 5 µm, thus preparing a water-based ink of Example A6.

An evaluation of properties was carried out as follows for the carbon black dispersions a to c containing modified carbon blacks as described above and the water-based inks of Examples A1 to A6 prepared using these carbon black dispersions.

(Measurement of Mean Particle Diameter of Modified Carbon Black)

An aqueous solution prepared to a modified carbon black concentration of 0.065 wt % was subjected to measurement using a Microtrac 9340-UPA (trade name, made by Microtrac) particle size analyzer. (Measurement of Amounts of Lactone Groups and Carboxyl Groups Present in Modified Carbon Black)

The obtained modified carbon black was dried for 15 hours at 60° C., and using this carbon black, using an HP5890A (trade name, made by Hewlett-Packard) pyrolytic gas chromatograph, the lactone groups were decomposed at 358° C. and the carboxyl groups at 650° C., and the $CO_2$ produced was measured. The amounts of lactone groups and carboxyl groups present in the carbon black were calculated from the measurement results.

(Method of Measuring Viscosity of Carbon Black Dispersion)

A dispersion prepared to a modified carbon black concentration of 15 wt % was subjected to measurement using an RE550L (trade name, made by Toki Sangyo Co., Ltd.) E-type viscometer.

(Method of Measuring Absorbance of Modified Carbon Black)

An aqueous solution prepared to a modified carbon black concentration of 0.001 wt % was subjected to measurement using a UV-1600PC (trade name, made by Shimadzu Corporation) spectrophotometer.

(Method of Measuring Settling Rate of Modified Carbon Black)

30 g of a liquid prepared to 5 wt % of the modified carbon black, 10 wt % of glycerol and 10 wt % of diethylene glycol mono-n-butyl ether was sealed in a settling tube, and centrifugation was carried out for 10 minutes with a gravity acceleration of 11000 G. 4 g of the supernatant was weighed out accurately, and was diluted in a 1 L measuring flask. Next, the diluted liquid was measured out into a 5 ml transfer pipette, and was diluted in a 100 mL measuring flask. The absorbance W1 of this liquid at a wavelength of 500 nm was measured. The absorbance W0 upon similarly diluting the prepared liquid before centrifugation was measured, and the settling rate was calculated from the formula Settling rate (%)=[1−(absorbance $W1$)/(absorbance $W0$)]×100

(Method of Measuring Settling upon Leaving Water-Based Ink)

50 g of the water-based ink was left for half a year at room temperature, and it was visually determined whether or not settling had taken place.

(Measurement of Reflection Density and L*a*b* Color System Values of Printed Article Printed Using Water-Based Ink)

The obtained water-based ink was filled into an EM-900C (trade name, made by Seiko Epson Corporation) ink jet recording apparatus, and printing was carried out on Xerox-P (trade name, made by Fuji Xerox) neutral plain paper. Adjustment was carried out such that the amount applied of the ink during the printing was 1 mg/cm². After drying the printed article, the reflection density (QD value) was measured using a Macbeth TR-927 (trade name, made by Kollmorgen Corporation) densitometer. Moreover, the L*a*b* color system values were measured using a JP7100F (trade name, made by JUKI) spectral colorimeter. The color tone at this time was observed visually.

The results are shown in Table 1.

TABLE 1

|  |  | Example |  |  |  |  |  |
|---|---|---|---|---|---|---|---|
|  |  | 1 | 2 | 3 | 4 | 5 | 6 |
| Carbon black raw material powder | Primary particle diameter (nm) | 18 |  | 16 |  | 17 |  |
|  | BET specific surface area ($m^2/g$) | 185 |  | 220 |  | 200 |  |
|  | DBP oil absorption (mL/100 g) | 200 |  | 230 |  | 220 |  |
|  | BET specific surface area/ DBP oil absorption | 0.93 |  | 0.96 |  | 0.91 |  |
| Modified carbon black | Mean particle diameter (nm) | 190 |  | 180 |  | 190 |  |
|  | Mean particle diameter/ primary particle diameter | 10.6 |  | 11.3 |  | 11.2 |  |
|  | Amount of lactone groups present (μmol/g) | 531 |  | 580 |  | 559 |  |
|  | Amount of carboxyl groups present (μmol/g) | 715 |  | 796 |  | 776 |  |
|  | Absorbance (measurement wavelength 500 nm) | 0.477 |  | 0.472 |  | 0.476 |  |
|  | Settling rate (%) | 18 |  | 10 |  | 15 |  |
| Carbon black dispersion | Carbon black dispersion | A |  | B |  | C |  |
|  | Viscosity (mPa · s) | 8 |  | 10 |  | 9 |  |
| Water-based ink | Settling upon leaving? | No | No | No | No | No | No |
|  | OD value of printed article | 1.49 | 1.43 | 1.47 | 1.40 | 1.48 | 1.41 |
|  | L*a*b* color system values of printed article — L* value | 45.86 | 46.30 | 46.00 | 46.93 | 46.00 | 46.58 |
|  | a* value | 0.53 | 0.53 | 0.51 | 0.51 | 0.50 | 0.50 |
|  | b* value | 0.64 | 0.64 | 0.61 | 0.61 | 0.63 | 0.63 |
|  | Color tone of printed article | Deep black | Deep black | Deep black | Deep black | Deep black | Deep black |

As is clear from Table 1, with the water-based inks prepared using modified carbon blacks of Examples A, there was no settling of the carbon black over a long period, and a deep black color was obtained upon printing.

Moreover, as comparative examples, modified carbon blacks and carbon black dispersions of Comparative Examples A1 to A5 were prepared using the same manufacturing method as for carbon black dispersion a, except that the carbon black raw material powders shown under Comparative Examples A1 to A5 in Table 2 were used instead of the carbon black raw material powder used in carbon black dispersion a in Examples A. Furthermore, using the carbon black dispersions thus obtained, water-based inks of Comparative Examples A1 to A5 were prepared using the same preparation method as the water-based ink of Example A1. For the modified carbon blacks, carbon black dispersions and water-based inks thus obtained, an evaluation of properties was carried out as with Examples A1 to A6. The results are shown in Table 2.

TABLE 2

|  |  | Comparative Example |  |  |  |  |
|---|---|---|---|---|---|---|
|  |  | 1 | 2 | 3 | 4 | 5 |
| Carbon black raw material powder | Primary particle diameter (nm) | 17 | 24 | 18 | 18 | 40 |
|  | BET specific surface area ($m^2/g$) | 200 | 125 | 163 | 200 | 58 |
|  | DBP oil absorption (mL/100 g) | 150 | 110 | 162 | 165 | 168 |
|  | BET specific surface area/ DBP oil absorption | 1.33 | 1.14 | 1.01 | 1.21 | 0.35 |
| Modified carbon black | Mean particle diameter (nm) | 110 | 160 | 180 | 175 | 305 |
|  | Mean particle diameter/ primary particle diameter | 6.5 | 6.7 | 10 | 9.7 | 7.6 |
|  | Amount of lactone groups present (μmol/g) | 650 | 315 | 486 | 517 | 155 |
|  | Amount of carboxyl groups present (μmol/g) | 900 | 500 | 680 | 715 | 253 |
|  | Absorbance (measurement wavelength 500 nm) | 0.415 | 0.510 | 0.446 | 0.431 | 0.455 |
|  | Settling rate (%) | 9 | 68 | 58 | 19 | 98 |

TABLE 2-continued

|  |  | Comparative Example | | | | |
|---|---|---|---|---|---|---|
|  |  | 1 | 2 | 3 | 4 | 5 |
| Carbon black dispersion | Viscosity (mPa · s) | 4 | 3.2 | 3.8 | 4.6 | 2.0 |
| Water-based ink | Settling upon leaving? | No | Yes | Yes | No | Yes |
|  | OD value of printed article | 1.38 | 1.47 | 1.37 | 1.36 | 1.35 |
|  | L*a*b* color system values of printed article — L* value | 47.56 | 45.47 | 47.59 | 47.88 | 47.02 |
|  | a* value | 0.50 | 0.53 | 0.50 | 0.50 | 0.33 |
|  | b* value | 1.06 | 0.38 | 1.09 | 1.11 | −1.0 |
|  | Color tone of printed article | Yellowish/reddish black | Deep black | Yellowish/reddish black | Yellowish/reddish black | Bluish black |

As is clear from Table 2, with the water-based inks prepared using modified carbon blacks for which embodiment A was not applied, there was settling of the carbon black, and/or a yellowish/reddish or bluish black color was obtained upon printing.

Examples B

[Preparation of Carbon Black Dispersion 1 (Carbon Black for which Embodiment B Applied)]

500 g of a carbon black raw material powder prepared using the furnace method having a primary particle diameter of 17 nm, a BET specific surface area of 215 m²/g, a DBP oil absorption of 210 mL/100 g, and BET specific surface area/DBP oil absorption=1.02 was added into 3750 g of ion exchange water, and the temperature was raised to 50° C. while stirring using a dissolver. After that, an aqueous solution of 6600 g of sodium hypochlorite (effective halogen concentration=12%) was instilled in over 3.5 hours at 50 to 60° C. while pulverizing with a sand mill using zirconia beads of diameter 0.8 mm, and then the pulverization with the sand mill was continued for a further 30 minutes, thus obtaining a reaction liquid containing modified carbon black. This reaction liquid was filtered using 400 mesh wire netting, thus separating the zirconia beads and unreacted carbon black from the reaction liquid. A KOH 5% aqueous solution was added to the reaction liquid obtained through the separation to adjust the pH to 7.5, then desalination and purification were carried out using an ultrafilter membrane until the electrical conductivity reached 1.5 mS/cm, and then concentration was further carried out until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 13 wt %, whereby a carbon black dispersion 1 was obtained. The settling rate for this carbon black dispersion 1 was measured using the method described earlier to be 54%. Moreover, a dispersion was prepared by stirring and mixing together 38.5 wt % of carbon black dispersion 1 (converting into the carbon black concentration, 5 wt %), 10 wt % of glycerol, 10 wt % of diethylene glycol mono-n-butyl ether, and 41.5 wt % of ion exchange water, and measurement was carried out using the method described earlier, whereupon the settling rate was 26%. Moreover, a dispersion was prepared by accurately weighing out 2.31 g of carbon black dispersion 1 and diluting in a 1000 mL measuring flask (converting into the carbon black concentration gives 0.30 g/L), and using a Microtrac 9340-UPA (trade name, made by Microtrac) particle size analyzer, the 50% cumulative diameter was measured to be 200 nm.

Preparation of Carbon Black Dispersion 2 (Carbon Black for which Embodiment B Applied)

200 g of a carbon black raw material powder prepared using the furnace method having a primary particle diameter of 18 nm, a BET specific surface area of 185 m²/g, a DBP oil absorption of 200 mL/100 g, and BET specific surface area/DBP oil absorption=0.93 was added into 1500 g of ion exchange water, and the temperature was raised to 50° C. while stirring using a dissolver. After that, an aqueous solution of 2220 g of sodium hypochlorite (effective halogen concentration 12%) was instilled in over 3.5 hours at 50 to 60° C., and immediately after the instillation had been completed glass beads of diameter 3 mm were added, and stirring was carried out for 30 minutes at 50° C., thus obtaining a reaction liquid containing modified carbon black. This reaction liquid was filtered using 400 mesh wire netting, thus separating the glass beads and unreacted carbon black from the reaction liquid. An NaOH 5% aqueous solution was added to the reaction liquid obtained through the separation to adjust the pH to 7.5, desalination and purification were carried out using an ultrafilter membrane until the electrical conductivity reached 1.5 mS/cm, and concentration was further carried out until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 13 wt %, whereby a carbon black dispersion 2 was obtained. The settling rate for this carbon black dispersion 2 was measured using the method described earlier to be 45%. Moreover, a dispersion was prepared by stirring and mixing together 38.5 wt % of carbon black dispersion 2 (converting into the carbon black concentration, 5 wt %), 10 wt % of glycerol, 10 wt % of diethylene glycol mono-n-butyl ether, and 41.5 wt % of ion exchange water, and measurement was carried out using the method described earlier, whereupon the settling rate was 18%. Moreover, a dispersion was prepared by accurately weighing out 2.31 g of carbon black dispersion 2 and diluting in a 1000 mL measuring flask (converting into the carbon black concentration gives 0.30 g/L), and using a Microtrac 9340-UPA (trade name, made by Microtrac) particle size analyzer, the 50% cumulative diameter was measured to be 190 nm.

[Preparation of Carbon Black Dispersion 3 (Carbon Black for which Embodiment B not Applied)]

500 g of a carbon black raw material powder prepared using the channel method having a primary particle diameter of 20 nm, a BET specific surface area of 125 m$^2$/g, a DBP oil absorption of 170 mL/100 g, and BET specific surface area/DBP oil absorption=0.74 was added into 3750 g of ion exchange water, and the temperature was raised to 50° C. while stirring using a dissolver. After that, an aqueous solution of 6600 g of sodium hypochlorite (effective halogen concentration=12%) was instilled in over 3.5 hours at 50 to 60° C. while pulverizing with a sand mill using zirconia beads of diameter 0.8 mm, and then the pulverization with the sand mill was continued for a further 30 minutes, thus obtaining a reaction liquid containing modified carbon black. This reaction liquid was filtered using 400 mesh wire netting, thus separating the zirconia beads and unreacted carbon black from the reaction liquid. A KOH 5% aqueous solution was added to the reaction liquid obtained through the separation to adjust the pH to 7.5, then desalination and purification were carried out using an ultrafilter membrane until the electrical conductivity reached 1.5 mS/cm, and then concentration was further carried out until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 13 wt %, whereby a carbon black dispersion 3 was obtained. The settling rate for this carbon black dispersion 3 was measured using the method described earlier to be 72%. Moreover, a dispersion was prepared by stirring and mixing together 38.5 wt % of carbon black dispersion 3 (converting into the carbon black concentration, 5 wt %), 10 wt % of glycerol, 10 wt % of diethylene glycol mono-n-butyl ether, and 41.5 wt % of ion exchange water, and measurement was carried out using the method described earlier, whereupon the settling rate was 65%. Moreover, a dispersion was prepared by accurately weighing out 2.31 g of carbon black dispersion 3 and diluting in a 1000 mL measuring flask (converting into the carbon black concentration gives 0.30 g/L), and using a Microtrac 9340-UPA (trade name, made by Microtrac) particle size analyzer, the 50% cumulative diameter was measured to be 224 nm.

[Preparation of Carbon Black Dispersion 4 (Carbon Black for which Embodiment B not Applied)]

200 g of a carbon black raw material powder prepared using the furnace method having a primary particle diameter of 16 nm, a BET specific surface area of 250 m$^2$/g, a DBP oil absorption of 155 mL/100 g, and BET specific surface area/DBP oil absorption=1.61 was added into 1500 g of ion exchange water, and the temperature was raised to 50° C. while stirring using a dissolver. After that, an aqueous solution of 2220 g of sodium hypochlorite (effective halogen concentration 12%) was instilled in over 3.5 hours at 50 to 60° C., and immediately after the instillation had been completed glass beads of diameter 3 mm were added, and stirring was carried out for 30 minutes at 50° C., thus obtaining a reaction liquid containing modified carbon black. This reaction liquid was filtered using 400 mesh wire netting, thus separating the glass beads and unreacted carbon black from the reaction liquid. An NaOH 5% aqueous solution was added to the reaction liquid obtained through the separation to adjust the pH to 7.5, desalination and purification were carried out using an ultrafilter membrane until the electrical conductivity reached 1.5 mS/cm, and concentration was further carried out until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 13 wt %, whereby a carbon black dispersion 4 was obtained. The settling rate for this carbon black dispersion 4 was measured using the method described earlier to be 7%. Moreover, a dispersion was prepared by stirring and mixing together 38.5 wt % of carbon black dispersion 4 (converting into the carbon black concentration, 5 wt %), 10 wt % of glycerol, 10 wt % of diethylene glycol mono-n-butyl ether, and 41.5 wt % of ion exchange water, and measurement was carried out using the method described earlier, whereupon the settling rate was 6%. Moreover, a dispersion was prepared by accurately weighing out 2.31 g of carbon black dispersion 4 and diluting in a 1000 mL measuring flask (converting into the carbon black concentration gives 0.30 g/L), and using a Microtrac 9340-UPA (trade name, made by Microtrac) particle size analyzer, the 50% cumulative diameter was measured to be 120 nm.

Example B1

Water-based Ink 38.5 wt % of carbon black dispersion 1 (converting into the carbon black concentration, 5 wt %), 10 wt % of glycerol, 10 wt % of diethylene glycol mono-n-butyl ether, and 41.5 wt % of ion exchange water were stirred together, and filtration was carried out using a Membrane Filter (trade name, made by Millipore) made of polytetrafluoroethylene with a pore size of 5 μm, thus preparing a water-based ink of Example B1.

Example B2

Water-based Ink 53.8 wt % of carbon black dispersion 1 (converting into the carbon black concentration, 7 wt %), 10 wt % of glycerol, 3 wt % of triethylene glycol mono-n-butyl ether, 1 wt % of Olfine E1010 (trade name, made by Nissin Chemical Industry Co., Ltd.), 0.9 wt % of triethanolamine, and 31.3 wt % of ion exchange water were stirred together, and filtration was carried out using a Membrane Filter (trade name, made by Millipore) made of polytetrafluoroethylene with a pore size of 5 μm, thus preparing a water-based ink of Example B2.

Example B3

Water-based Ink

A water-based ink of Example B3 was prepared as with the water-based ink of Example B1, except that carbon black dispersion 2 was used as the carbon black dispersion.

Example B4

Water-based Ink

A water-based ink of Example B4 was prepared as with the water-based ink of Example B2, except that carbon black dispersion 2 was used as the carbon black dispersion.

Comparative Example B1

Water-based Ink

A water-based ink of Comparative Example B1 was prepared as with the water-based ink of Example B2, except that carbon black dispersion 3 was used as the carbon black dispersion.

Comparative Example B2

Water-based Ink

A water-based ink of Comparative Example B2 was prepared as with the water-based ink of Example B2, except that carbon black dispersion 4 was used as the carbon black dispersion.

For the water-based inks of Examples B1 to B4 and Comparative Examples B1 and B2 containing modified carbon blacks as described above, the following evaluation was carried out.

(Method of Measuring Settling Upon Leaving Water-Based Ink)

50 g of the water-based ink was left for half a year at room temperature, and it was visually determined whether or not settling had taken place.

(Measurement of OD Value of Printed Article Printed Using Water-Based Ink)

The obtained water-based ink was filled into an EM-900C (trade name, made by Seiko Epson Corporation) ink jet recording apparatus, and printing was carried out on Xerox-P (trade name, made by Fuji Xerox) neutral plain paper. Adjustment was carried out such that the amount applied of the ink during the printing was 1 mg/cm$^2$. After drying the printed article, the reflection density (OD value) was measured using a Macbeth TR-927 (trade name, made by Kollmorgen Corporation) densitometer. Moreover, the color tone of the printed article was observed visually.

The results are shown in Table 3.

in which is used dispersion 3 which contains a carbon black for which the $S_A$–$S_B$ settling rate value is outside the range of the present invention, the results obtained were that a highish OD value is exhibited, and a printed article with a fairly deep black color is obtained, but settling occurs upon leaving for a long period. Moreover, with the water-based ink of Comparative Example B2 in which is used dispersion 4 which contains a carbon black for which the $S_A$–$S_B$ settling rate value and the 50% cumulative diameter are outside the ranges of embodiment B, settling did not occur upon leaving for a long period, but the OD value was low, and a printed article with a yellowish/reddish black color was obtained.

The settling rates $S_C$ for the water-based inks of Examples B1 to B4 and Comparative Examples B1 and B2 were as follows. The measurement of $S_C$ (the settling rate for the water-based ink) was carried out using the same procedure as with the method of measuring the settling rate of the modified carbon black described earlier (the settling rate for the carbon black dispersion 1 or 2), except that the dispersion (mixed/prepared liquid) filled into the settling tube was changed to the water-based ink.

$S_C$ (settling rate for water-based ink)

Example B1: 26

Example B2: 22

Example B3: 25

Example B4: 20

TABLE 3

|  |  | Dispersion 1 | Dispersion 2 | Dispersion 3 | Dispersion 4 |
|---|---|---|---|---|---|
| Carbon black raw material powder | Primary particle diameter | 17 | 18 | 20 | 16 |
|  | BET specific surface area | 215 | 185 | 125 | 250 |
|  | DBP oil absorption | 210 | 200 | 170 | 155 |
|  | BET/DBP | 1.02 | 0.93 | 0.74 | 1.61 |
| Modified carbon black | Settling rate $S_A$ (*1) | 54 | 45 | 72 | 7 |
|  | Settling rate $S_B$ (*2) | 26 | 18 | 65 | 6 |
|  | $S_A$ – $S_B$ | 28 | 27 | 7 | 1 |
|  | 50% cumulative diameter | 200 | 190 | 224 | 120 |
| Water-based ink | Name | Example B1 | Example B2 | Example B3 | Example B4 | Comparative Example B1 | Comparative Example B2 |
|  | Settling upon leaving for long period? | No | No | No | No | Yes | No |
|  | OD value | 1.52 | 1.45 | 1.49 | 1.43 | 1.38 | 1.29 |
|  | Color tone | Deep black | Deep black | Deep black | Deep black | Deep black | Yellowish/reddish black |

(*1) $S_A$: Settling rate (%) for dispersion A prepared to 13 wt % of carbon black and 87 wt % of water
(*2) $S_B$: Settling rate (%) for dispersion B prepared to 5 wt % of carbon black, 10 wt % of glycerol, 10 wt % of diethylene glycol mono-n-butyl ether and 75 wt % of water As is clear from Table 3, with the water-based inks prepared using modified carbon blacks within the scope of embodiment B, settling does not occur even upon leaving for a long period, a high OD value is exhibited, and a printed article with a deep black color is obtained. On the other hand, with the water-based ink of Comparative Example B1

Comparative Example B1: 62

Comparative Example B2: 5

From the above results, it can be seen that the settling rate $S_C$ for the water-based ink is similar to the settling rate $S_B$ for the dispersion, and hence that if a modified carbon black for which the settling rate is stipulated in accordance with embodiment B, or a dispersion containing such a modified carbon black, is used, then a desired water-based ink can be obtained.

INDUSTRIAL APPLICABILITY

The present invention has industrial applicability as a carbon black that can be used in a water-based ink that is used in ink jet printer printing, that has a reduced settling rate and can thus be stored stably for a long period, for which clogging is not prone to occurring, and for which the reflection density (OD value) is high and hence dense printing with a deep black color is possible, and a water-based ink having this carbon black dispersed therein.

We claim:

1. A modified carbon black obtained by carrying out oxidation treatment on a carbon black having a primary particle diameter of 11 to 18 nm, a BET specific surface area of at least 180 m$^2$/g, a DBP oil absorption of at least 180 mL/100 g, and a value of the BET specific surface area (m$^2$/g) divided by the DBP oil absorption (mL/100 g) of 0.75 to 1.3, the modified carbon black characterized in that at least lactone groups and carboxyl groups are introduced onto the surface thereof, and the ratio of the mean particle diameter to the primary particle diameter is at least 8.5.

2. The modified carbon black according to claim 1, characterized in that the value of the BET specific surface area (m$^2$/g) divided by the DBP oil absorption (mL/100 g) is 0.9 to 1.1.

3. The modified carbon black according to claim 1, characterized in that the mean particle diameter of the modified carbon black is 150 to 250 nm.

4. The modified carbon black according to claim 1, characterized in that the amount of lactone groups is at least 500μmol/g, and the amount of carboxyl groups is at least 700 μmol/g, relative to the weight of carbon black in the modified carbon black.

5. The modified carbon black according to claim 1, characterized in that the modified carbon black has a settling rate of not more than 30%.

6. The modified carbon black according to claim 1, characterized in that the lactone groups and the carboxyl groups are introduced by oxidizing with a hypohalous acid and/or a hypohalite.

7. The modified carbon black according to claim 1, characterized in that the absorbance at a wavelength of 500 nm of a measurement liquid diluted to a modified carbon black concentration of 0.001 wt % is at least 0.47.

8. A modified carbon black that can be dispersed and/or dissolved in water without a dispersant, the modified carbon black characterized in that:

the relationships $10 \leq S_A S_B \leq 50$ and $S_B \leq 40$ hold, wherein SA is the settling rate (%) for a dispersion A prepared to 13 wt % of the carbon black and 87 wt % of water, and $S_B$ is the settling rate (%) for a dispersion B prepared to 5 wt % of the carbon black, 10 wt % of glycerol, 10 wt % of diethylene glycol mono-n-butyl ether and 75 wt % of water; and the 50% cumulative diameter as measured with a dispersion prepared to a concentration of the carbon black of 0.3 g/L is in a range of 150 to 350 nm.

9. The modified carbon black according to claim 8, characterized in that the relationships $20 \leq S_A S_B \leq 50$ and $S_B \leq 30$ hold.

10. The modified carbon black according to claim 8, characterized in that the 50% cumulative diameter as measured with a dispersion prepared to a concentration of the carbon black of 0.3 g/L is in a range of 150 to 250 nm.

11. The modified carbon black according to claim 8, characterized by being a modified carbon black obtained by carrying out surface modification on a carbon black having a primary particle diameter of 11 to 18 nm, a BET specific surface area of at least 180 m$^2$/g, a DBP oil absorption of at least 180 mL/100 g, and a value of the BET specific surface area (m$^2$/g) divided by the DBP oil absorption (mL/100 g) of 0.75 to 1.3.

12. The modified carbon black according to claim 11, characterized in that the value of the BET specific surface area (m$^2$/g) divided by the DBP oil absorption (mL/100 g) is 0.9 to 1.1.

13. The modified carbon black according to claim 8, characterized in that the carbon black is obtained by carrying out oxidation treatment on a carbon black raw material powder with a hypohalous acid and/or a hypohalite.

14. A method of manufacturing the modified carbon black according to claim 1, the method characterized by having at least the steps of adding an aqueous solution of a hypohalous acid and/or a hypohalite to a liquid obtained by suspending a carbon black raw material powder prepared using the furnace method in water, carrying out oxidation treatment using a disperser with a 0.6 to 3 mm-diameter milling medium, filtering with 100 to 500 mesh wire netting, and desalinizing the liquid obtained.

15. A carbon black dispersion, characterized by having the modified carbon black according to claim 1 dispersed in water.

16. A water-based ink, characterized by containing the modified carbon black according to claim 1.

17. A water-based ink, characterized by containing at least glycerol, a glycol ether compound, and the modified carbon black according to claim 8.

18. The water-based ink according to claim 17, characterized in that the glycol ether compound is selected from glycol butyl ether compounds.

19. The water-based ink according to claim 16, characterized by having a penetrability such that the penetration time upon applying the ink onto a recording medium in an amount of 1 mg/cm$^2$ is less than 1 second.

20. The water-based ink according to claim 16, characterized by having a surface tension at 20° C. of not more than 45 mN/m.

21. The water-based ink according to claim 16, characterized by containing a glycol butyl ether type aqueous organic solvent.

22. The water-based ink according to claim 16, characterized by containing a nonionic surfactant.

23. The water-based ink according to claim 22, characterized in that the nonionic surfactant is an acetylene glycol surfactant.

24. A recording method for carrying out printing on a recording medium by attaching an ink, the recording method characterized by using the water-based ink according to claim 16 as the ink.

25. An ink jet recording method for carrying out printing by ejecting droplets of an ink and attaching the droplets onto a recording medium, the ink jet recording method characterized by using the water-based ink according to claim 16 as the ink.

26. A recorded article, characterized in that it is obtained by carrying out recording using the recording method according to claim 24.

* * * * *